US010070451B2

(12) United States Patent
Yonehara (10) Patent No.: US 10,070,451 B2
(45) Date of Patent: Sep. 4, 2018

(54) COMMUNICATION CONTROL APPARATUS (71) Applicant: DENSO CORPORATION, Kariya, Aichi-pref. (JP)

(72) Inventor: Satoshi Yonehara, Chita-gun (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 77 days.

(21) Appl. No.: 14/770,728

(22) PCT Filed: Dec. 19, 2013

(86) PCT No.: PCT/JP2013/007459
§ 371 (c)(1),
(2) Date: Aug. 26, 2015

(87) PCT Pub. No.: WO2014/132314
PCT Pub. Date: Sep. 4, 2014

(65) Prior Publication Data
US 2016/0014795 A1  Jan. 14, 2016

(30) Foreign Application Priority Data
Feb. 27, 2013  (JP) .................................. 2013-037116

(51) Int. Cl.
*H04W 4/00* (2018.01)
*H04W 72/10* (2009.01)
*H04W 48/18* (2009.01)
*H04W 72/12* (2009.01)
(Continued)

(52) U.S. Cl.
CPC ........... *H04W 72/10* (2013.01); *H04W 48/18* (2013.01); *H04W 72/1215* (2013.01);
(Continued)

(58) Field of Classification Search
CPC ........... H04W 72/0453; H04W 72/042; H04W 72/0413; H04L 5/0007; H04L 5/0053
(Continued)

(56) References Cited

U.S. PATENT DOCUMENTS

2004/0029619 A1 * 2/2004 Liang ..................... H01Q 21/28
455/562.1
2005/0041624 A1 * 2/2005 Hui ......................... G01S 19/36
370/335
(Continued)

FOREIGN PATENT DOCUMENTS

JP    2004247939 A    9/2004
JP    2010245825 A    10/2010
(Continued)

OTHER PUBLICATIONS

International Search Report and Written Opinion (in Japanese with English Translation) for PCT/JP2013/007459, dated Mar. 25, 2014; ISA/JP.

*Primary Examiner* — Joshua Kading
*Assistant Examiner* — Atique Ahmed
(74) *Attorney, Agent, or Firm* — Harness, Dickey & Pierce, P.L.C.

(57) ABSTRACT

A communication control apparatus includes a communication control unit executing a requested communication service via a wireless unit selected from a plurality of wireless units. The communication services are assigned with different priorities; the wireless units are assigned with different priorities. Suppose that a communication service, which is newly requested, has a priority higher than that on a communication service that is being executed. The communication control unit executes the newly requested communication service via a wireless unit having the highest priority among all of usable wireless units.

4 Claims, 6 Drawing Sheets (51) Int. Cl.
*H04L 5/00* (2006.01)
*H04W 72/04* (2009.01)

(52) U.S. Cl.
CPC ......... *H04L 5/0053* (2013.01); *H04W 72/042* (2013.01); *H04W 72/0413* (2013.01); *H04W 72/0453* (2013.01); *H04W 72/1242* (2013.01)

(58) Field of Classification Search
USPC ....................................................... 370/329
See application file for complete search history.

(56) References Cited

U.S. PATENT DOCUMENTS

| | | | |
|---|---|---|---|
| 2005/0215284 A1* | 9/2005 | Su | H04W 72/1215 455/556.2 |
| 2006/0083172 A1* | 4/2006 | Jordan | H04L 43/50 370/241 |
| 2008/0159327 A1* | 7/2008 | Pernu | G06F 9/4881 370/444 |
| 2011/0250920 A1* | 10/2011 | Shimizu | H04W 72/1215 455/512 |
| 2012/0077505 A1 | 3/2012 | Wietfeldt et al. | |
| 2012/0077506 A1 | 3/2012 | Wietfeldt et al. | |
| 2012/0207101 A1* | 8/2012 | Chang | H04W 74/0825 370/329 |
| 2013/0005262 A1 | 1/2013 | Sakata | |

FOREIGN PATENT DOCUMENTS

| | | |
|---|---|---|
| WO | WO-2010041412 A1 | 4/2010 |
| WO | WO-2011123839 A1 | 10/2011 |

* cited by examiner

| WIRELESS UNITS \ SERVICES | SAFETY | SECURITY | VEHICLE REMOTE | NAVIGATION MAP UPDATING | ENTERTAINMENT |
|---|---|---|---|---|---|
| 1ST (CELL PHONE) | 1-1 | 2-1 | 3-1 | 4-4 | 5-4 |
| 2ND (WiFi) | 1-2 | 2-2 | 3-2 | 4-1 | 5-2 |
| 3RD (SATELLITE) | × | × | × | 4-2 | 5-1 |
| 4TH (BT) | 1-3 | 2-3 | 3-3 | 4-3 | 5-3 |

FIG. 3

|  | 1ST (CELL PHONE) | 2ND (WiFi) | 3RD (SATELLITE) | 4TH (BT) |
|---|---|---|---|---|
| 1ST (CELL PHONE) |  | ○ | × | ○ |
| 2ND (WiFi) | ○ |  | ○ | ○ |
| 3RD (SATELLITE) | × | ○ |  | ○ |
| 4TH (BT) | ○ | ○ | ○ |  |

COMMUNICATION CONTROL APPARATUS

CROSS REFERENCE TO RELATED APPLICATION APPLICATIONS

This application is a U.S. National Phase Application under 35 U.S.C. 371 of International Application No. PCT/JP2013/007459 filed on Dec. 19, 2013 and published in Japanese as WO 2014/132314 A1 on Sep. 4, 2014. This application is based on and claims the benefit of priority from Japanese Patent Application No. 2013-037116 filed on Feb. 27, 2013. The entire disclosures of all of the above applications are incorporated herein by reference.

TECHNICAL FIELD

The present disclosure relates to a communication control apparatus.

BACKGROUND ART

Recent communication control apparatuses mounted in vehicles each use different communications including not only DCM (Data Communication Module) communication utilizing cellular phone lines but also Bluetooth (registered trademark) communication, WiFi communication, satellite communication. Such a communication control apparatus controls the different communications by employing respectively different control units that control corresponding wireless units, complicating the structure of the apparatus itself. This leads to a study to control a plurality of wireless units by one control unit. Patent literature 1 discloses a technique of controlling a plurality of wireless units by a single software signal processor.

PRIOR ART LITERATURES

Patent Literature

Patent literature 1: JP 2004-247939 A

SUMMARY OF INVENTION

Patent literature 1 indicates, however, a need of a plurality of dedicated process programs corresponding to communication methods of wireless units, complicating the software.

The present disclosure is to provide a communication control apparatus capable of controlling a plurality of wireless units by a single control unit without complicating the structure and software.

According to an example of the present disclosure, a communication control apparatus is provided as follows. The communication control apparatus includes a communication control unit executing a requested communication service out of at least two communication services via a wireless unit selected from at least two wireless units. The communication services are assigned with different priorities; the wireless units are assigned with different priorities. When a communication service that is newly requested is assigned with a priority higher than a priority assigned to a communication service that is being executed, the communication control unit executes the newly requested communication service via a wireless unit having the highest priority among all of usable wireless units.

That is, one communication control unit executes required communication service by using an optimum wireless unit on the basis of priorities of the communication services and priorities of wireless units. The configuration allows the control of a plurality of wireless units by a single communication control unit, without complicating the structure and software.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Embodiments of communication control apparatuses will be described with reference to the drawings. The same reference numerals are designated to substantially the same elements in the embodiments and their description will not be repeated.

First Embodiment

Figure 1:
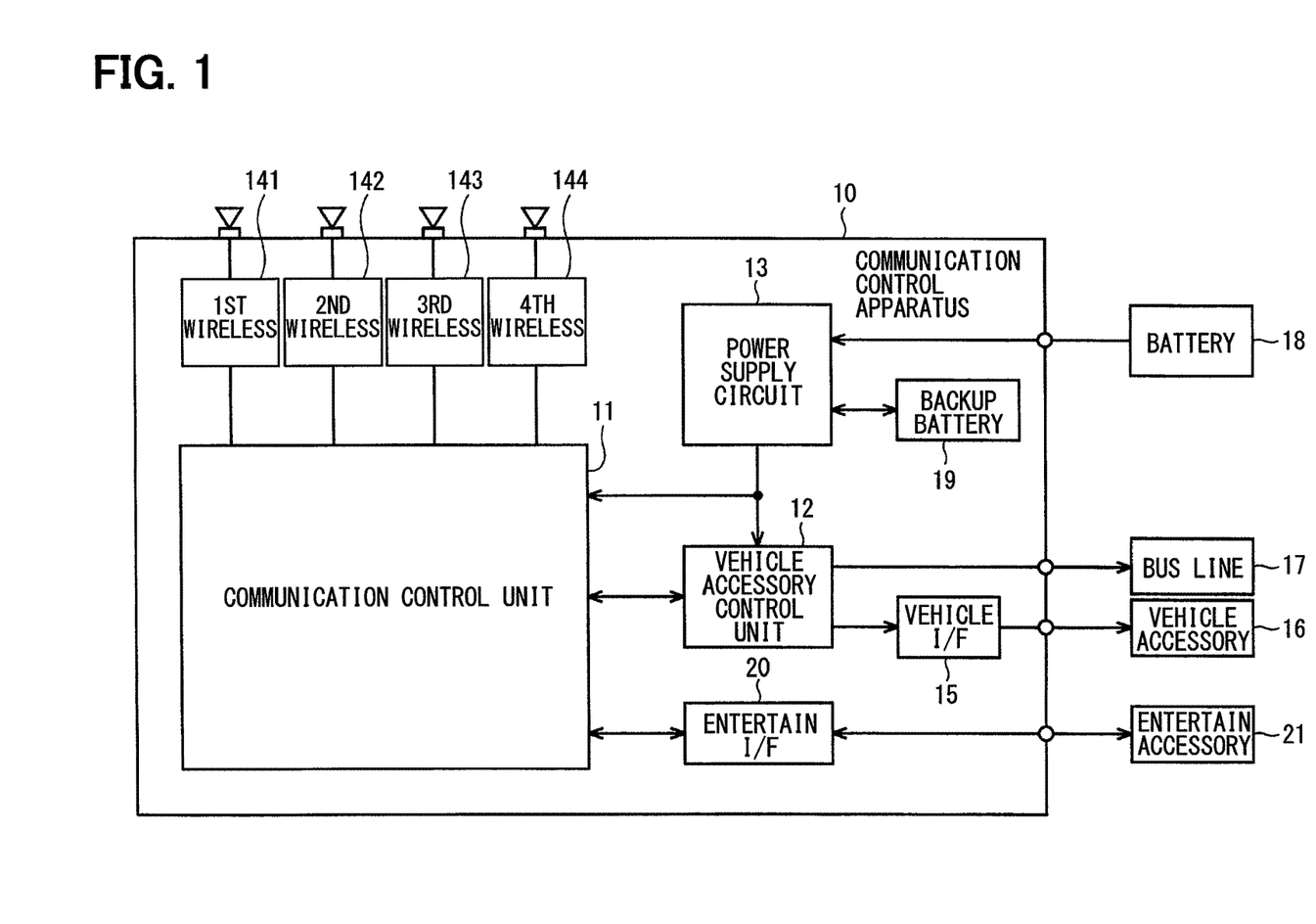
FIG. 1 is a block diagram schematically illustrating a configuration of a communication control apparatus according to a first embodiment.

A communication control apparatus 10 in FIG. 1, which may be a vehicular communication control apparatus mounted in a vehicle, includes a communication control unit 11, a vehicle accessory control unit 12, and a power supply circuit 13. The communication control unit 11, which is also referred to as a communication control circuit, includes mainly a CPU to execute various communication services via a plurality of wireless units 141, 142, 143, 144. All of the wireless units 141, 142, 143, 144 are provided inside of the communication control apparatus 10. The communication control apparatus 10 can execute the communication services including five services of a safety service, a security service, a vehicle remote service, a navigation map updating service, and an entertainment-related service.

The safety service is to send emergency notification to an unshown external center server when detecting activation of an airbag unit. The security service is to send an intrusion notification to an unshown external center server when detecting an intruder into a vehicle using an intrusion sensor. The safety service and the security service each need to use a wireless unit reliably performing communication to an external source from the communication control apparatus 10.

The vehicle remote service is to receive a door lock instruction signal, a door unlock instruction signal, a charge start instruction signal, or an engine start instruction signal from an external source outside of the vehicle. The vehicle remote service needs to use a wireless unit reliably performing communication from an external source to the communication control apparatus 10.

The navigation map updating service is to send a map distribution request from the communication control apparatus 10 to an unshown external map data distribution server, and to distribute, in reply to the request, the map data from the map data distribution server to the communication control apparatus 10. The entertainment-related service is to send a content distribution request from the communication control apparatus 10 to an unshown external content distribution server, and to distribute, in replay to the request, the content from the content distribution server to the communication control apparatus 10. The content may be any kind of content, such as music content or video content, needing to handle a relatively large amount of data. The navigation map updating service and the entertainment-related service each need to use a wireless unit performing large-amount data communication at low cost from an external source to the communication control apparatus 10.

A first wireless unit 141, which is used for communication service via a cell phone line, thus performs communication via the cell phone line. A second wireless unit 142, which is used for communication service via a WiFi communication circuit, thus performs communication via the WiFi communication circuit. A third wireless unit 143, which is used for communication service via a satellite communication line, thus performs communication via the satellite communication line. A fourth wireless unit 144, which is used for communication service via a Bluetooth communication line, thus performs communication via the Bluetooth communication line. The communication control unit 11 executes a communication service, which is selected from at least two communication services (the above five services in the present embodiment) according to a request from an external source, via a wireless unit selected from at least two wireless units (the four wireless units 141 to 144 in the present embodiment). The request for communication service to the communication control unit 11 may be made by a user manipulation or a remote manipulation from an external server.

The vehicle accessory control unit 12 is connected to various vehicle accessories 16 via a vehicle interface 15. The vehicle accessory control unit 12 is connected to a bus line 17 of CAN (Controller Area Network). The vehicle accessory control unit 12, which is also referred to as a vehicle accessory control circuit, includes mainly a CPU to control operation of the various vehicle accessories 16 via the vehicle interface 15. The vehicle accessories 16 include various vehicle units, sensors, and actuators such as a navigation unit, an airbag unit, a door-lock mechanism, and an intrusion sensor. The vehicle accessory control unit 12 is connected to the communication control unit 11. The communication control unit 11 and the vehicle accessory control unit 12 cooperate to execute control on communication service and control on the vehicle accessories 16.

The power supply circuit 13 controls power from a vehicle battery 18 and supplies it to the communication control apparatus 10. The power supply circuit 13 is connected to a backup battery 19. The power supply circuit 13 supplies power from the backup battery 19 to the communication control apparatus 10, e.g., when the vehicle battery 18 is unavailable in executing a safety service.

The communication control unit 11 is connected to various entertainment-related accessories 21 (hereinbelow, called "entertainment-related accessories 21") via an entertainment interface 20. The communication control unit 11 controls the operation of the various entertainment-related accessories 21 via the entertainment interface 20. The entertainment-related accessories 21 include an in-vehicle audio unit and an in-vehicle video unit.

Next, the wireless units/services combination data of the communication control apparatus 10 will be described. As in FIG. 2, the wireless units/services combination data specifies in matrix (i) priorities of communication services which can be executed by the communication control apparatus 10 and (ii) priorities of the wireless units which can be used by the communication control apparatus 10 for services. The wireless units/services combination data has in-matrix cells each storing numerical values connected with a hyphen; the left side of the hyphen indicates priority of communication service, and the right side indicates priority of the wireless unit. It is assumed that the smaller the numerical value is, the higher the priority is.

Figure 2:
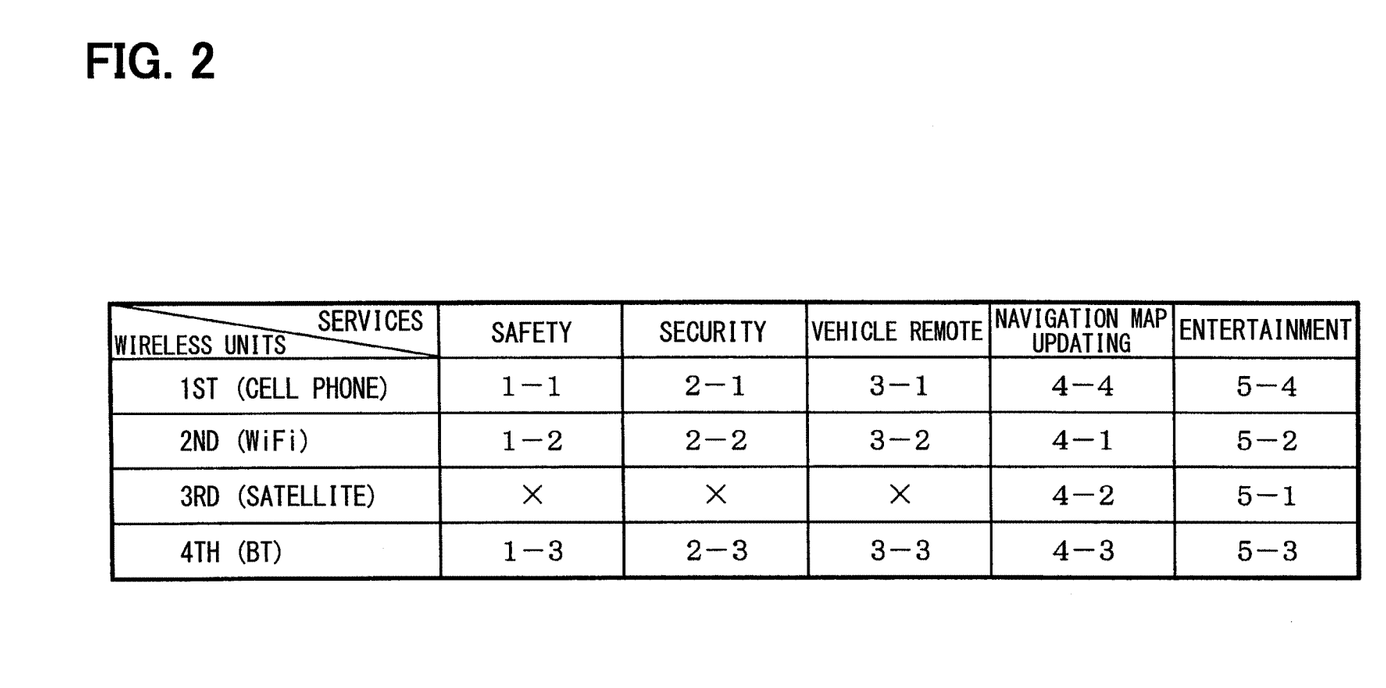
FIG. 2 is a diagram illustrating an example of data of combinations between wireless units and services.

More specifically, the communication services are assigned with different priorities. The highest priority is assigned to the safety service; the subsequently descending priorities are assigned to the security service, the vehicle remote service, the navigation map updating service, and the entertainment-related service, in this order.

The wireless units 141 to 144 are assigned with different priorities. The safety service, the security service, and the vehicle remote service, all of which request reliable connection to the external center server, assign the highest priority to the first wireless unit 141 and the subsequently descending priorities to the second wireless unit 142 and the fourth wireless unit 144, in this order. The third wireless unit 143 is assigned with none of the priority.

The navigation map updating service, which requests low-cost data communication of a large amount, assigns the highest priority to the second wireless unit 142, and the subsequently descending priorities to the third wireless unit 143, the fourth wireless unit 144, and the first wireless unit 141, in this order. The entertainment-related service as bidirectional service assigns the highest priority to the third wireless unit 143 and the subsequently descending priorities to the second wireless unit 142, the fourth wireless unit 144, and the first wireless unit 141, in this order.

Next, the wireless units/wireless units combination data of the communication control apparatus 10 will be described. As in FIG. 3, the wireless units/wireless units combination data specifies, in a matrix, combinations of wireless units which can be simultaneously used and combinations of wireless units which cannot be simultaneously used. The first wireless unit 141 can be used simultaneously with the second wireless unit 142 or the fourth wireless unit 144 but cannot be used simultaneously with the third wireless unit 143. In contrast, the third wireless unit 143 can be used simultaneously with the second wireless unit 142 or the fourth wireless unit 144 but cannot be used simultaneously with the first wireless unit 141. This is because the first and third wireless units 141 and 143 that are used simultaneously would interfere with each other with a high probability. By contrast, each of the second wireless unit 142 and the fourth wireless unit 144 can be used simultaneously with any of the wireless units with no or little possibility of interference.

Next, an example of the operation of the communication control apparatus 10 will be described. Although the control to be described below is mainly performed by the communication control unit 11, the communication control apparatus 10 will be described as a main component of the operation.

It is noted that a flowchart or the processing of the flowchart in the present application includes sections (also referred to as steps), each of which is represented, for instance, as A1, B1, C1. Further, each section can be divided into several sub-sections while several sections can be combined into a single section. Furthermore, each of thus configured sections can be also referred to as a device or module. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

Figure 4:
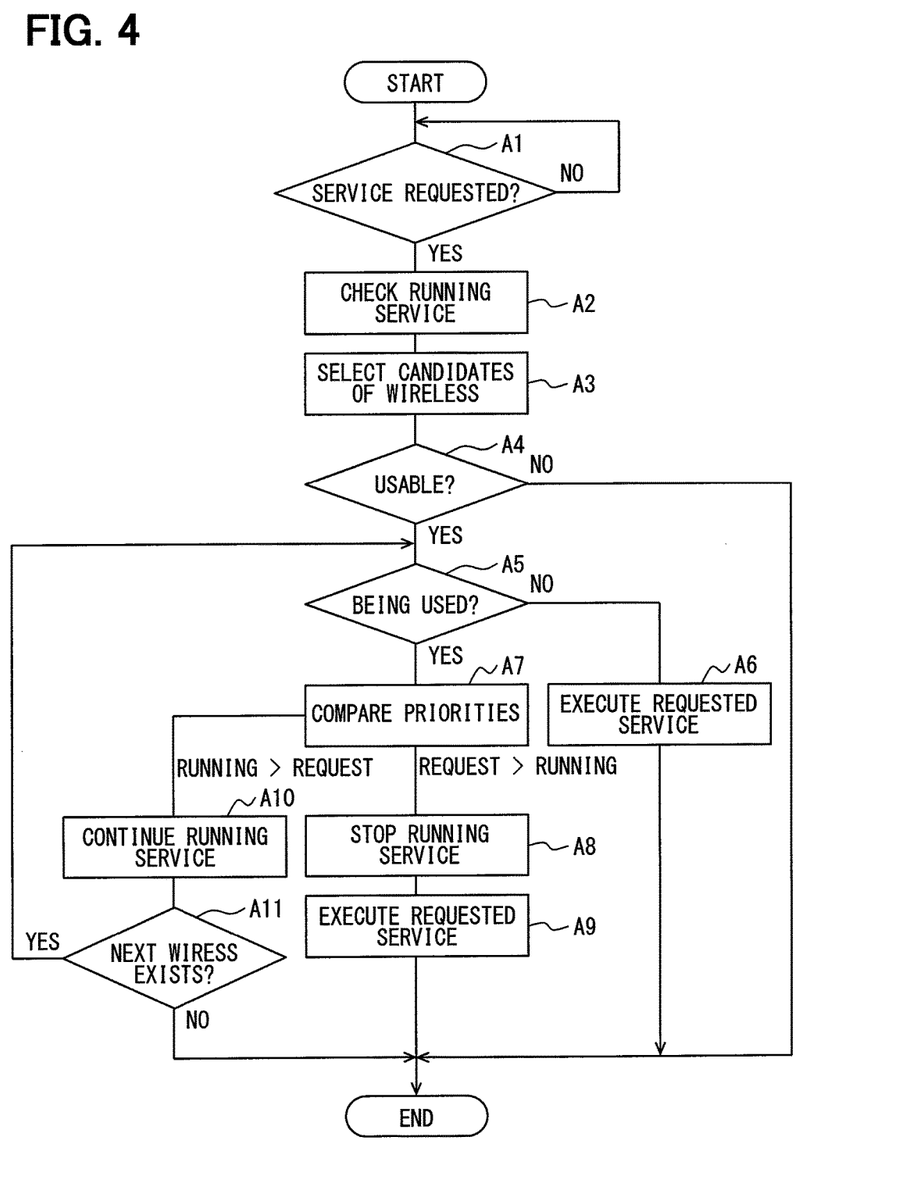
FIG. 4 is a flowchart illustrating an example of operations of the communication control apparatus.

As in FIG. 4, when a request for communication service is received from the outside (A1: YES), the communication control apparatus 10 checks a communication service being currently executed (hereinbelow, called "running service") (A2). The communication control apparatus 10 selects (lists) candidates of wireless units used for the requested communication service (hereinbelow, called "requested service") (A3).

Referring to FIG. 2, when the requested service is the safety service, the communication control apparatus 10 refers to the wireless units/services combination data and selects the first, second, and fourth wireless units 141, 142, 144 as candidates of wireless units. When the requested service is the entertainment-related service, the communication control apparatus 10 refers to the wireless units/services combination data and selects the first to fourth wireless units 141 to 144 as candidates of wireless units.

Figure 3:
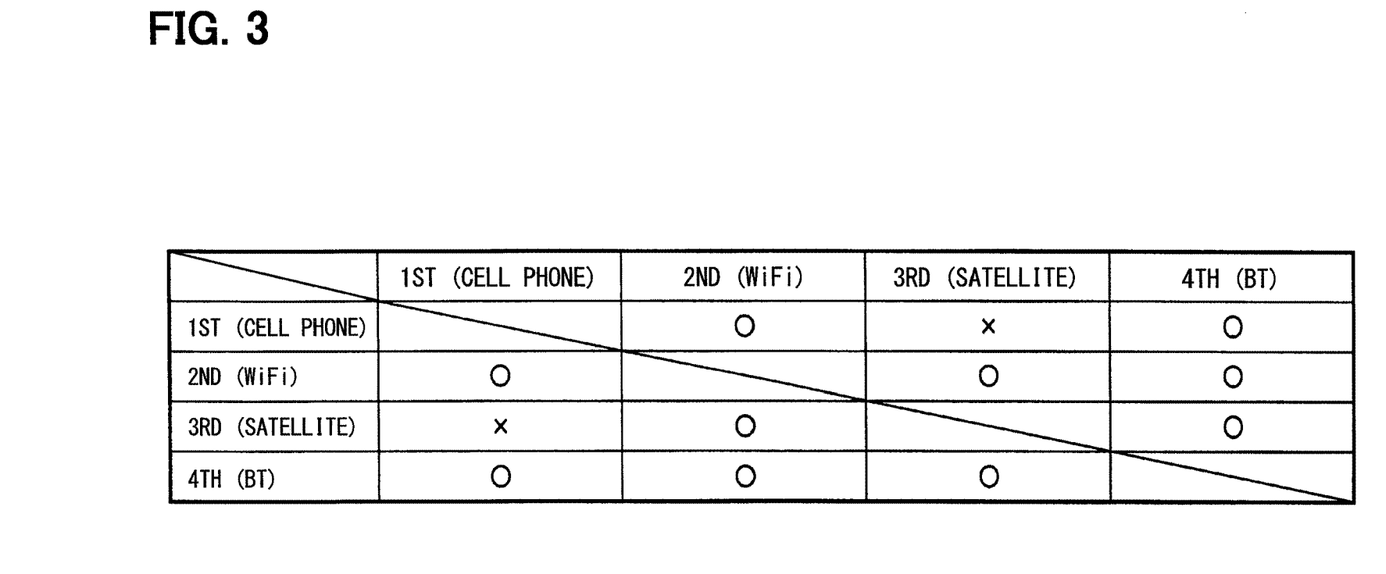
FIG. 3 is a diagram illustrating an example of data of combinations between wireless units and wireless units.

When the requested service is the entertainment-related service and the running service is the safety service, the communication control apparatus 10 does not select the third wireless unit 143 as candidates of wireless units but selects the first, second, and fourth wireless units 141, 142, 144 as candidates of wireless units. Specifically, suppose that while the safety service assigning the highest priority to the first wireless unit 141 is executed via this first wireless unit 141, the newly requested entertainment-related service assigning the highest priority to the third wireless unit 143 may be executed via this third wireless unit 143. Such case would undergo interference if the first and third wireless units 141, 143 are actually used simultaneously. In selecting candidates of wireless units, the communication control apparatus 10 therefore refers also to the wireless units/wireless units combination data and excludes wireless units which may interfere each other from the candidates.

After the candidates of wireless units are selected according to the requested service, the communication control apparatus 10 checks whether the selected wireless units are usable or not (A4). Specifically, the communication control apparatus 10 checks whether abnormality occurs in the selected wireless units and, when no abnormality occurs, determines that the wireless units are "usable." When abnormality occurs, the communication control apparatus 10 determines that the wireless units are "unusable." The states where a wireless unit is abnormal include a state where no response from a wireless unit is recognized, a state where intensity of radio waves from a wireless unit is too weak to perform communication, and a state where a communication with a wireless unit cannot be established.

When all of the selected wireless units are "unusable" (A4: NO), the communication control apparatus 10 finishes the control. By contrast, when at least one of the selected wireless units is "usable" (A4: YES), the communication control apparatus 10 checks whether the wireless unit in the usable state is being used in the running service or not (A5). When a plurality of wireless units are usable, first, the communication control apparatus 10 extracts the wireless unit having the highest priority and, then, checks whether the wireless unit having the highest priority is being used in the running service or not.

When the usable wireless unit is not used in the running service (A5: NO), the communication control apparatus 10 starts execution of the requested service via the usable wireless unit (A6) and finishes the control. The running service is continuously executed. By contrast, when the usable wireless unit is used in the running service (A5: YES), the communication control apparatus 10 compares the priority of the requested service and the priority of the running service (A7). When the priority of the requested service is higher than that of the running service, the communication control apparatus 10 stops the running service (A8). The communication control apparatus 10 starts execution of the running service via the wireless unit used in the running service (A9) and finishes the control.

When the priority of the requested service is lower than that of the running service, the communication control apparatus 10 continues execution of the running service (A10). The communication control apparatus 10 checks whether there is a wireless unit having the second highest priority in the wireless units determined as "usable" in step A4 (A11). When the corresponding wireless unit exists (A11: YES), the communication control apparatus 10 moves to step A5 and checks whether the wireless unit is used in the running service or not. By contrast, when the corresponding wireless unit does not exist (A11: NO), the communication control apparatus 10 finishes the control.

The embodiment sets different priorities on the communication services, and different priorities on the wireless units 141 to 144. When the priority of the requested service is higher than that of the running service, the communication control apparatus 10 executes the requested service via the wireless unit having the highest priority among all of usable wireless units through the control of the communication control unit 11. The single communication control unit 11 executes a requested service by using an optimum wireless unit on the basis of the priorities on the communication services and the priorities on the wireless units 141 to 144. Such a manner allows the single communication control unit 11 to control the plurality of wireless units 141 to 144 without complicating the structure and software.

When the priority of the requested service is lower than that of the running service, the communication control apparatus 10 executes the requested service via the wireless unit having the highest priority among all of usable wireless units except the wireless unit used for the running service, through the control of the communication control unit 11. The running service having the priority higher than that of the requested service can be thus continuously executed using the optimum wireless unit.

Second Embodiment

Figure 5:
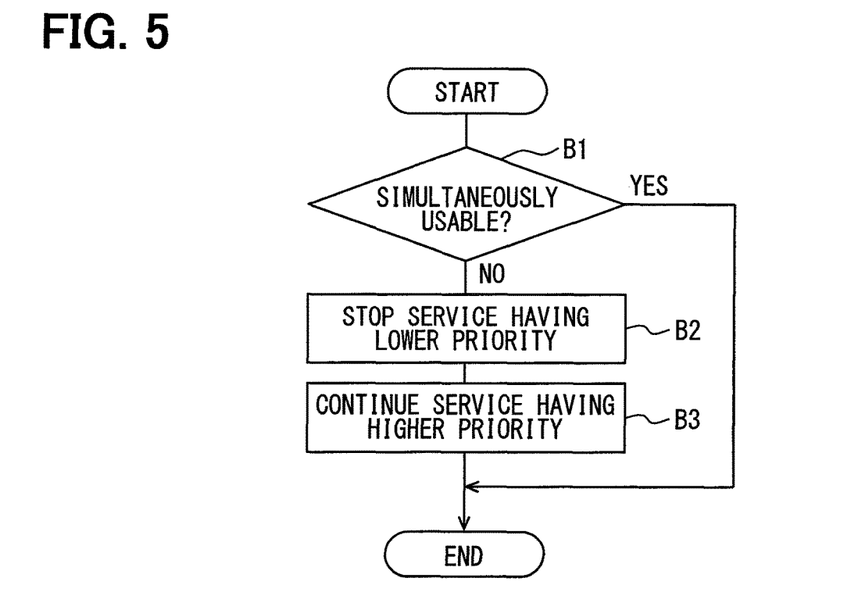
FIG. 5 is a flowchart illustrating an example of operations of a communication control apparatus according to a second embodiment.

A second embodiment relates to an example of control additionally performed to suppress occurrence of interference in executing a requested service while continuing a running service, instead of stopping a running service and executing a requested service. As in FIG. 5, in executing a requested service while continuing a running service, the communication control apparatus 10 refers to the wireless units/wireless units combination data and checks whether a wireless unit used in the running service and a wireless unit to be used in the requested service can be used simultaneously or not (B1). When the wireless units can be used simultaneously (B1: YES), the communication control apparatus 10 finishes the control, continues the running service, and starts execution of the requested service. By contrast, when the wireless units cannot be used simultaneously (B1: NO), the communication control apparatus 10 stops execution of the running service or the requested service, whichever has lower priority (B2), and continues execution of the running service or the requested service (B3), whichever has higher priority, finishing the control.

The embodiment describes the communication control apparatus 10, which executes a plurality of communication services simultaneously through the control of the communication control unit 11, responding to cases when a plurality of wireless units used in the communication services interfere each other by stopping execution of the communication service having lower priority. Such a manner can prevent more reliably the occurrence of interference accompanying simultaneous use of the plurality of wireless units.

When the total number of running services and requested services is three or more, the communication control apparatus 10 may stop execution of only the communication service having the lowest priority or stop execution of more than one communication service having lower priority.

Third Embodiment

Figure 6:
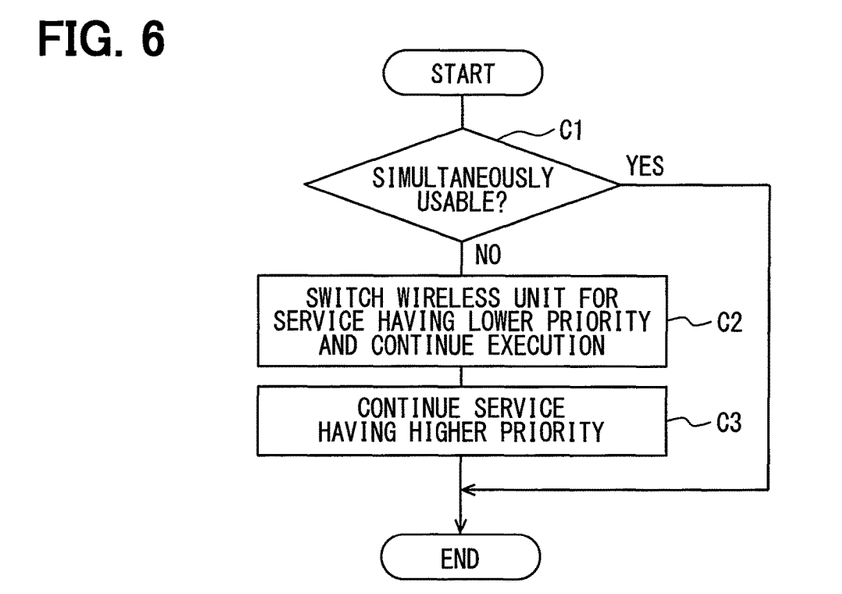
FIG. 6 is a flowchart illustrating an example of operations of a communication control apparatus according to a third embodiment.

A third embodiment also relates to an example of control additionally performed to suppress occurrence of interference in executing a requested service while continuing a running service, instead of stopping a running service and executing a requested service. As in FIG. 6, in executing a requested service while continuing a running service, the communication control apparatus 10 refers to the wireless unit/wireless unit combination data and checks whether a wireless unit used in the running service and a wireless unit to be used in the requested service can be used simultaneously or not (C1). When the wireless units can be used simultaneously (C1: YES), the communication control apparatus 10 finishes the control, continues the running service, and starts execution of the requested service. By contrast, when the wireless units cannot be used simultaneously (C1: NO), the communication control apparatus 10 switches the wireless unit used for a lower-priority service that is the running service or the requested service, whichever has lower priority, to a different wireless unit, continues execution of the lower-priority service (C2), and continues execution of a higher-priority service that is the running service or the requested service, whichever has higher priority (C3), finishing the control.

The embodiment describes the communication control apparatus 10, which executes a plurality of communication services simultaneously through the control of the communication control unit 11, responding to cases when a plurality of wireless units used in the communication services interfere each other by switching the wireless unit used for a communication service having lower priority to a different wireless unit and continues the execution of the communication service. Such a manner can prevent more reliably occurrence of interference accompanying simultaneous use of the plurality of wireless units.

When the total number of running services and requested services is three or more, the communication control apparatus 10 may switch only a wireless unit used for the communication service having the lowest priority or switch wireless units used for more than one communication services having lower priority.

Other Embodiments

Figure 7:
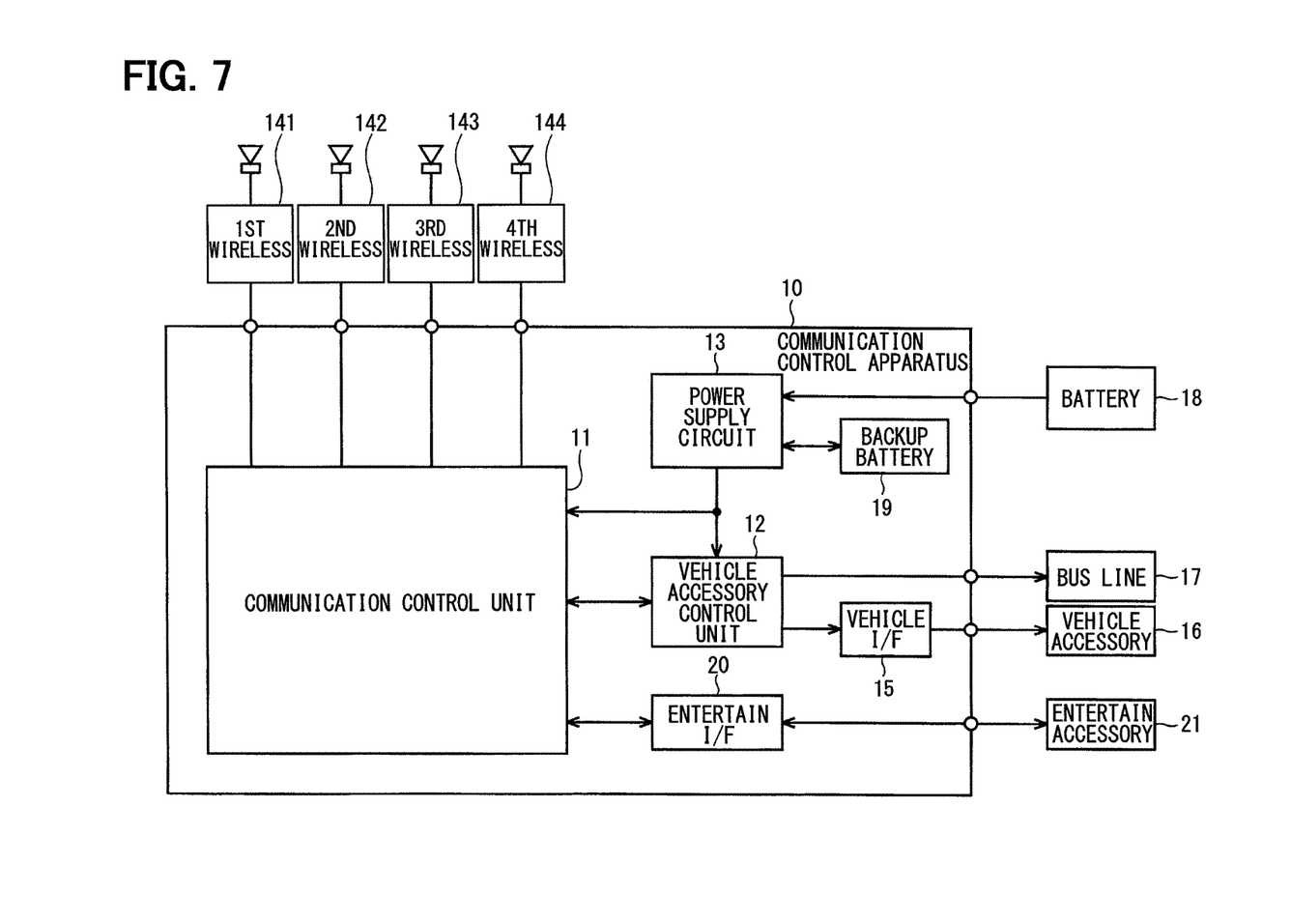
FIG. 7 is a block diagram schematically illustrating a configuration of a communication control apparatus according to a modification.

The present invention is not limited to the foregoing embodiments but can be applied to various embodiments without departing from the gist. As in FIG. 7, the wireless units 141 to 144 may be external wireless units attached on the outside of the communication control apparatus 10. A part of the wireless units may be provided on the inside of the communication control apparatus 10 and the rest of the wireless units may be provided on the outside. The kinds and the number of communication services which can be executed by the communication control apparatus 10 and the kinds and the number of wireless units can be properly changed. The communication control apparatus is not limited to an in-vehicle apparatus but may be a portable communication terminal such as a smartphone.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A communication control apparatus comprising:
 a communication control unit configured to execute a plurality of communication-application services via a plurality of wireless units, wherein the plurality of wireless units includes at least three wireless units; and
 a storage storing:
  a wireless unit combination data that identifies, from among the wireless units, a combination of two wireless units as either operable together or not operable together, wherein the combination of two wireless units identified as operable together are authorized to be used at same time to execute different services, and
  a service and wireless unit combination data that contains: (i) a service priority data that associates each of the services with a priority level such that each of the services is assigned a different priority level, (ii) a service-specific wireless unit priority data that associates each of the wireless units with a priority level with respect to each of the services such that each of the wireless units is assigned a different priority level with respect to each of the services, and one of the wireless units is assigned the highest priority level from among the priority levels with respect to one of the services and another one of the wireless units is assigned the lowest priority level with respect to a different one of the services,
 wherein:
 when the communication control unit is currently executing a service as an executed service and receives a request to execute a new service:
  (a) based on the service priority data and the service-specific wireless unit priority data, the communication control unit permits one of the executed service and the new service to be executed as a first service via a first wireless unit from among the wireless units, regardless of whether the first wireless unit has been used to execute the executed service, and, concurrently,
  (b) based on the service-specific wireless unit priority data of the service and the wireless unit combination data, the communication control unit permits the other one of the executed service and the new service to be executed as a second service via a second wireless unit from among the wireless units excluding a third wireless unit, wherein:

the first service has a priority level higher than a priority level assigned to the second service, in the service priority data, the first wireless unit has the highest priority level with respect to the first service in the service-specific wireless unit priority data, the third wireless unit is identified as being not operable together with the first wireless unit in the wireless unit combination data, and the second wireless unit is identified as being able to be used for the second service in the service-specific wireless unit priority data and is identified as being operable together with the first wireless unit in the wireless unit combination data.

2. The communication control apparatus according to claim 1, wherein the services include two or more services selected from among four services that are a safety service, a security service, a vehicle remote service, a navigation map updating service, and an entertainment-related service.

3. A communication control apparatus comprising:

a communication control unit configured to execute a plurality of communication-application services via a plurality of wireless units in a vehicle, the plurality of wireless units including a first wireless unit for cell phone line communication via a cell phone line, a second wireless unit for WiFi communication, a third wireless unit for satellite communication, and a fourth wireless unit for Bluetooth communication, and the plurality of communication-application services include a safety service that sends an emergency notification, a security service that sends an intrusion notification, a vehicle remote service that receives at least one of a door lock instruction signal, a door unlock instruction signal, a charge start instruction signal, and an engine start instruction signal from an external source outside of the vehicle, a navigation map updating service that sends a map distribution request and receive map data in reply to the map distribution request, and an entertainment-related service that sends a content distribution request and receives content in reply to the content distribution request; and a storage storing:

wireless unit combination data indicating that the first wireless unit cannot be used simultaneously with the third wireless unit, that the first wireless unit can be used simultaneously with the second wireless unit, that the first wireless unit can be used simultaneously with the fourth wireless unit, that the second wireless unit can be used simultaneously with the third wireless unit, that the second wireless unit can be used simultaneously with the fourth wireless unit, and that the third wireless unit be used simultaneously with the fourth wireless unit, service and wireless unit combination data that contains: (i) a service priority data that associates each of the communication-application services with a service priority level such that each of the communication-application services is assigned a different service priority level, (ii) a service-specific wireless unit priority data that associates each of the wireless units with a service-specific wireless unit priority level with respect to each of the communication-application services such that each of the wireless units is assigned a different service-specific wireless unit priority level with respect to each of the communication-application services, and one of the wireless units is assigned a highest service-specific wireless unit priority level with respect to one of the communication-application services and another one of the wireless units is assigned a lowest service-specific wireless unit priority level with respect to a different one of the communication-application services, wherein:

in response to receiving a request to execute a new service from the plurality of communication-application services while the communication control unit is currently executing an executing service from the plurality of communication-application services, the communication control unit concurrently (a) permits one of the executing service and the new service to be executed as a first service via a first selected wireless unit from the plurality of wireless units, based on the service priority data and the service-specific wireless unit priority data, regardless of whether the first selected wireless unit was previously being used to execute the executing service, and (b) permits the other one of the executing service and the new service to be executed as a second service via a second selected wireless unit from among the plurality of wireless units, based on the service-specific wireless unit priority data of the service and the wireless unit combination data, except that when the first wireless unit is selected as the first selected wireless unit, the third wireless unit cannot be selected as the second selected wireless unit, and when the third wireless unit is selected as the first selected wireless unit, the first wireless unit cannot be selected as the second selected wireless unit, and wherein:

the service priority level of the first service is higher than the service priority level assigned to the second service in the service priority data, the first selected wireless unit has the highest service-specific wireless unit priority level with respect to the first service in the service-specific wireless unit priority data, and the second selected wireless unit is identified as being able to be used for the second service in the service-specific wireless unit priority data and is identified as being operable together with the first selected wireless unit in the wireless unit combination data.

4. The communication control apparatus according to claim 3, wherein the service priority data associates the safety service as having a highest service priority level, the security service as having a second highest service priority level, the vehicle remote service as having a third highest service priority level, the navigation map updating service as having a fourth highest service priority level, and the entertainment-related service as having a lowest service priority level.

* * * * *